United States Patent
Gomez et al.

(10) Patent No.: US 9,296,018 B2
(45) Date of Patent: Mar. 29, 2016

(54) GARBAGE CAN FOR DRINKS

(71) Applicant: GREEN CREATIVE, Lagny-sur-Marne (FR)

(72) Inventors: Remi Gomez, Paris (FR); Jean-Marc Meurville, Sens (FR); Jan-Francois Chamoux, Lagny-sur-Marne (FR); Nicolas Laurent, Tinqueux (FR)

(73) Assignee: GREEN CREATIVE, Lagny-sur-marne (FR)

( * ) Notice: Subject to any disclaimer, the term of this patent is extended or adjusted under 35 U.S.C. 154(b) by 0 days.

(21) Appl. No.: 14/357,513

(22) PCT Filed: Nov. 8, 2012

(86) PCT No.: PCT/EP2012/072098
§ 371 (c)(1),
(2) Date: May 9, 2014

(87) PCT Pub. No.: WO2013/068440
PCT Pub. Date: May 16, 2013

(65) Prior Publication Data
US 2014/0311956 A1    Oct. 23, 2014

(30) Foreign Application Priority Data
Nov. 10, 2011   (FR) ..................................... 11 60292

(51) Int. Cl.
| | |
|---|---|
| *B07C 5/34* | (2006.01) |
| *B65F 1/00* | (2006.01) |
| *B65F 1/14* | (2006.01) |
| *B30B 9/30* | (2006.01) |
| *B30B 9/32* | (2006.01) |
| *B65F 1/06* | (2006.01) |

(52) U.S. Cl.
CPC ............. *B07C 5/3408* (2013.01); *B30B 9/3014* (2013.01); *B30B 9/3039* (2013.01);
(Continued)

(58) Field of Classification Search
CPC ... B07C 5/3408; B65F 1/0033; B65F 1/0073; B65F 1/06; B65F 1/1405; B65F 2240/1126; B30B 9/3014; B30B 9/3039; B30B 9/321; B30B 9/125; B30B 9/14
USPC .................................................. 209/522, 523
See application file for complete search history.

(56) References Cited

U.S. PATENT DOCUMENTS 4,235,164 A * 11/1980 Allen et al. ................... 100/345
4,241,652 A * 12/1980 Smedlund ...................... 100/49
(Continued)

FOREIGN PATENT DOCUMENTS

BE    1 009 279 A3    1/1997
DE    73 05 853 U     9/1973
(Continued)

*Primary Examiner* — Joseph C Rodriguez
(74) *Attorney, Agent, or Firm* — Muncy, Geissler, Olds & Lowe, P.C.

(57) ABSTRACT

A beverage garbage can includes an enclosure having a top opening, a compression plate movable between a disengaged position and a compression position in which it closes the opening, a piston situated facing the opening and under the compression plate, the piston being mounted to move along an axis between a low position, an ejection position, and a high position, an ejector for engaging a container resting on the piston in the ejection position, to push it sideways to cause it to drop off the piston, and controlled motor means for successively causing the compression plate to close after a container has been inserted into the opening, causing the piston to rise so as to compress the container against the plate, causing the piston to be lowered to its ejection position, and causing the container to be ejected.

5 Claims, 3 Drawing Sheets

(52) U.S. Cl.
CPC .............. *B30B 9/321* (2013.01); *B65F 1/0033*
(2013.01); *B65F 1/1426* (2013.01); *B65F 1/06*
(2013.01); *B65F 2210/162* (2013.01); *B65F 2240/1126* (2013.01); *B65F 2240/12* (2013.01); *Y02W 30/10* (2015.05)

(56) References Cited

U.S. PATENT DOCUMENTS

| | | | | |
|---|---|---|---|---|
| 4,436,026 | A | * | 3/1984 | Imamura et al. ............... 100/45 |
| 4,953,682 | A | * | 9/1990 | Helbawi ...................... 194/208 |
| 5,423,492 | A | * | 6/1995 | Willis .......................... 241/81 |
| 6,817,462 | B1 | * | 11/2004 | Salda ........................... 194/208 |
| 8,471,165 | B2 | * | 6/2013 | Jokhovets et al. ............ 209/524 |
| 8,550,252 | B2 | * | 10/2013 | Borowski et al. ................ 209/3 |
| 8,555,781 | B1 | * | 10/2013 | Garcia ......................... 100/223 |
| 8,899,398 | B2 | * | 12/2014 | Wind ........................... 194/205 |
| 2003/0057144 | A1 | * | 3/2003 | Wang ........................... 209/636 |
| 2013/0180892 | A1 | * | 7/2013 | Marrapodi et al. ............. 209/10 |

FOREIGN PATENT DOCUMENTS

| | | |
|---|---|---|
| DE | 88 03 363 U1 | 5/1988 |
| WO | WO 2006/089990 A1 | 8/2006 |

\* cited by examiner

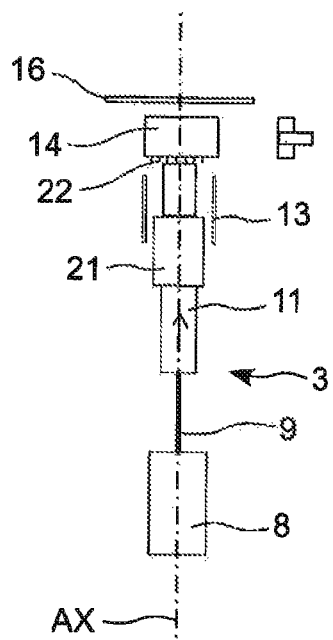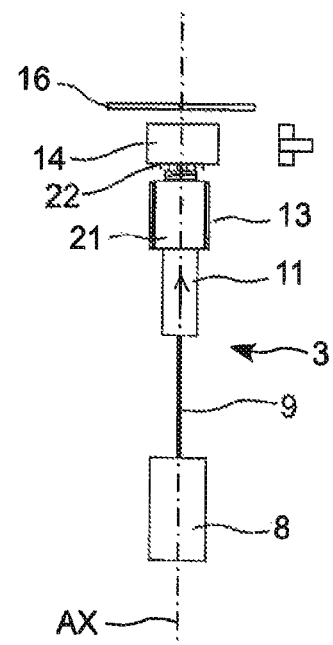
FIG. 4    FIG. 5
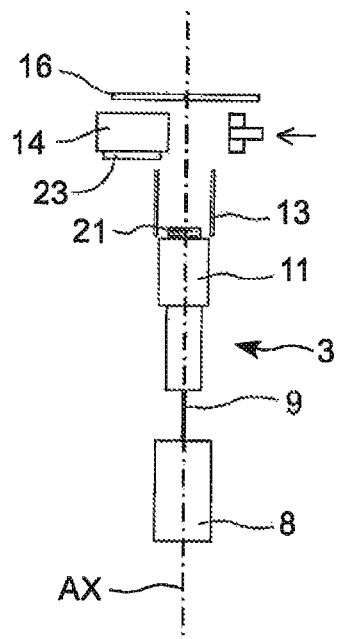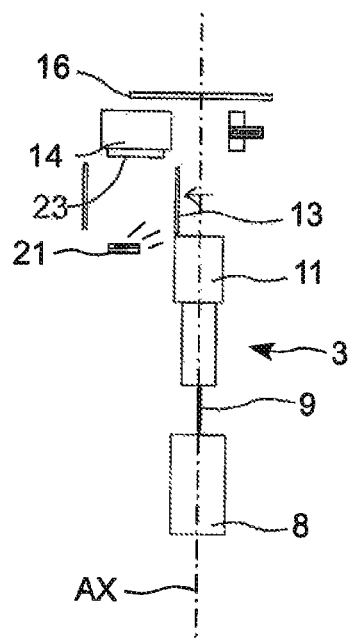
FIG. 6    FIG. 7

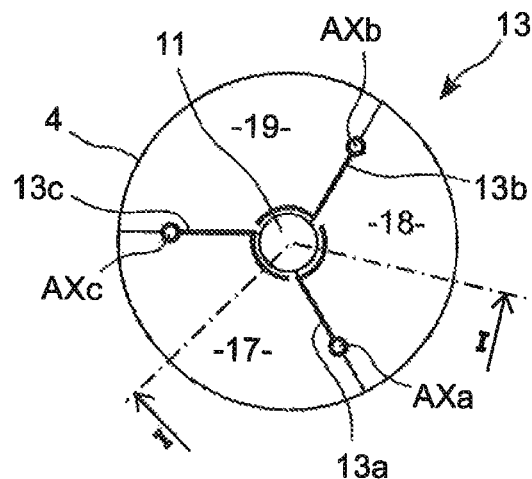 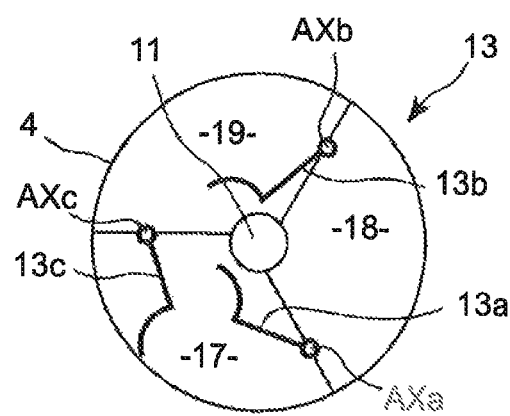
FIG. 8　　　　　FIG. 9
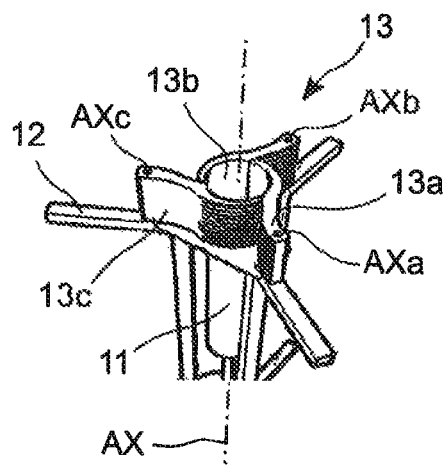 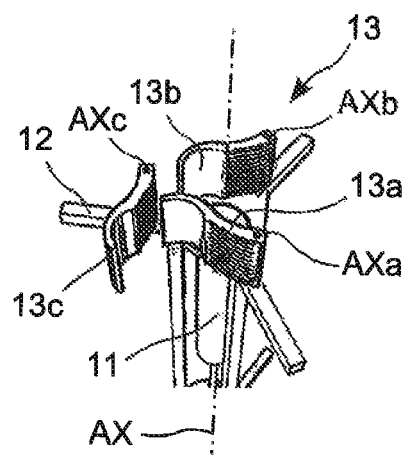
FIG. 10　　　　　FIG. 11

GARBAGE CAN FOR DRINKS

The invention relates in general to selective sorting, and it relates more particularly to processing beverages of soda or analogous types sold in bottles made of plastics material, in cans or tins made of metal or aluminum, or indeed consumed from goblets that may be made of plastics material or of card.

BACKGROUND OF THE INVENTION

Businesses are seeking to improve their environmental policies in order to comply with ever-increasing ecological issues. In practice, given the ever-increasing cost of processing waste, it is appropriate for a business to have means enabling it at reduced cost to sort selectively the various kinds of waste that it generates.

On this topic, the volume of waste that results from consuming beverages delivered by automatic dispensers such as dispensers of sodas, coffee, tea, etc., turns out to be considerable, such that processing this waste is expensive both for the business and for society as a whole.

OBJECT OF THE INVENTION

The object of the invention is to propose a solution for remedying that drawback by proposing a garbage can of simple architecture that enables the waste from such beverages to be sorted and reduced in volume.

SUMMARY OF THE INVENTION

To this end, the invention provides a beverage garbage can comprising an enclosure presenting a top opening and containing:
- a compression plate movable between a disengaged position and a compression position in which it closes the opening;
- a piston situated facing the opening below the compression plate, the piston being mounted to move in translation along an axis between a low position, an ejection position, and a high position in which it is close to the compression plate when it is closed;
- an ejector for pushing a container resting on the piston while in its ejection position in a sideways direction so as to cause the container to drop sideways off the piston;
- a control unit associated with motor means for successively causing the compression plate to close after a container has been inserted into the top opening, to cause the piston to rise towards its high position so as to compress the container against the compression plate, to cause the piston to be lowered to the ejection position, and to cause the container to be ejected by making it drop sideways off the piston;
- a drip pan situated in the bottom portion of the enclosure and adapted to collect liquid that might run out from the container and along the piston while the container is being compressed; and
- at least one receptacle offset sideways relative to the travel axis of the piston and extending between the bottom drip pan and the piston in its ejection position in order to collect the compressed container when it is ejected sideways by the ejector.

The invention also provides a garbage can as defined in this way, including identification means for identifying the type of container being processed, a plurality of receptacles distributed around the travel axis of the piston, an ejector suitable for pushing a container resting on the piston selectively to one or another of the receptacles, and wherein the control unit controls the ejector to cause it to push the container towards a receptacle that has been selected on the basis of the type of container recognized by the identification means.

The invention also provides a garbage can as defined in this way, wherein the identification means for identifying the type of container comprise a sensor for sensing the forces to which the piston is subjected while it is rising and moving back down, and means for analyzing variation in these forces in order to determine the initial height of the container and/or its initial weight and/or its compression strength and/or its height once compressed and/or its weight once compressed.

The invention also provides a garbage can as defined in this way, wherein the ejector comprises a plurality of paddles extending substantially radially relative to the travel axis of the piston and regularly distributed around this axis, each paddle being pivotally mounted at one of its ends carried by an axis that is off-center relative to the travel axis of the piston and parallel to this axis, and having another end forming a pusher that is closer to the travel axis of the piston, the pusher-forming ends of the various paddles being arranged so that together they surround the space situated above the piston in the ejection position when the ejector is at rest, and wherein a container is ejected in a direction orthogonal to a given paddle by causing the other two paddies to cause their ends to move away from the travel axis of the piston, and then causing the given paddle to turn in the opposite direction.

The invention also provides a garbage can as defined in this way, having three distinct receptacles uniformly distributed around the travel axis of the piston, and wherein the ejector has three paddles regularly distributed around the travel axis of the piston.

The invention also provides a garbage can as defined in this way, wherein the compression plate has spikes or sharp blades on its bottom face to pierce the container while it is being compressed against the plate by the piston rising towards its high position.

BRIEF DESCRIPTION OF THE FIGURES

FIG. 4 is a section view showing some of the elements of the garbage can of the invention at the beginning of compressing the container for processing;

FIG. 5 is a section view showing some of the elements of the garbage can of the invention at the end of compressing the container for processing;

FIG. 6 is a section view showing some of the elements of the garbage can of the invention before ejecting the container for processing;

FIG. 7 is a section view showing some of the elements of the garbage can of the invention while electing the container for processing;

FIG. 8 is a diagrammatic plan view of the ejector of the garbage can of the invention in a rest situation;

FIG. 9 is a diagrammatic plan view of the ejector of the garbage can of the invention while ejecting a container for processing;

FIG. 10 is a perspective view of the ejector of the garbage can of the invention at rest; and FIG. 11 is a perspective view of the ejector of the garbage can of the invention while ejecting a container.

DETAILED DESCRIPTION OF THE INVENTION

In the invention, use is made of the weight, of the height, and of the strength of the item that is put into the garbage can in order to determine whether it is a bottle made of plastics material, a can or tin made of steel or aluminum, or indeed a goblet made of plastics material or of card, in order to sort the item appropriately. In addition, the weight together with the height and the compression strength of the item can be evaluated by measuring the forces to which the piston is subjected during the item processing cycle.

Figure 1:
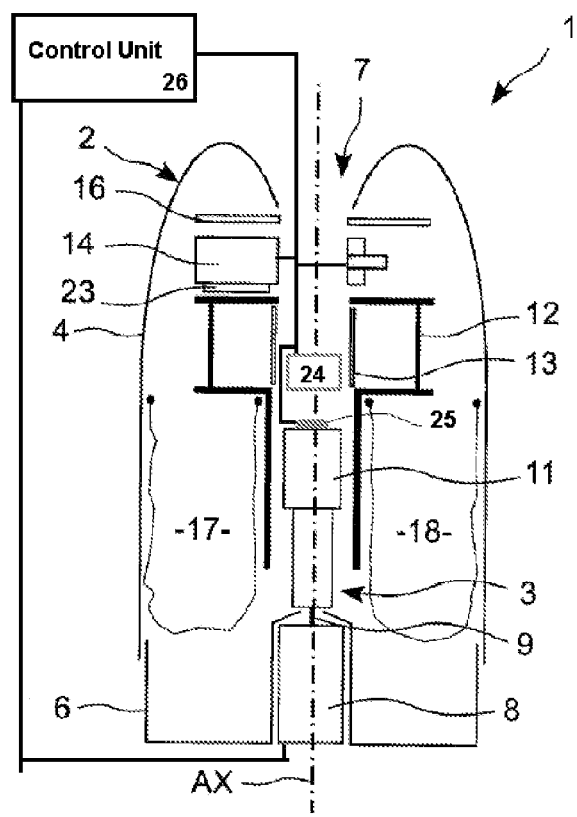
FIG. 1 is a section view of a garbage can of the invention showing all of its component elements.

The garbage can of the invention is referenced 1 in FIG. 1 and presents an external shape in the form of a circular cylinder about an axis AX of vertical orientation when the garbage can is in position, i.e. in operation.

The garbage can 1 has a casing 2 surrounding a central column 3 extending along the axis AX, the casing 2 having a top portion 4 fitted over and engaging on a bottom portion or base 6 of the garbage can that constitutes a drip pan for liquid. The top portion 4 has an opening 7 in the central region of its top end for admitting beverage containers for processing.

Going upwards, the central column 3 comprises a motor 8 driving a wormscrew 9 engaged in a piston 11 in order to move it vertically along the axis AX, and a carrier structure 12 surrounding the piston 11 and carrying at its top end an ejector 13 together with a compression plate 14 situated above the ejector 13, and a diaphragm 16 covering the compression plate 14.

The diaphragm 16 and the compression plate 14 extend horizontally in the central region of the garbage can, and each of them can occupy either a position in which it leaves the admission opening 7 free, or a position in which it closes the opening 7.

The garbage can 1 also has three distinct bags carried within its casing and regularly distributed around the central column 3. These bags extend vertically between the ejector 13 located at the top end of the column 3, and the motor 8 that is situated at the bottom end of the column 3, and they are upwardly open. Two of these three bags, given references 17 and 18, are visible in FIG. 1, which is a section on a line presenting an angle of one hundred twenty degrees at the axis AX.

The plan views of FIGS. 8 and 9 show more clearly the openings of these three bags 17, 18, and 19, which subdivide the circular section of the garbage can into three substantially identical portions, each occupying one hundred twenty degrees.

These three bags 17, 18, and 19 serve to subdivide the top end of the garbage can into three portions, and they respectively constitute receptacles for receiving plastics bottles, cans or tins, and goblets.

The garbage can 1 also includes a control unit 26 and motorized means together with sensors 24 and 25 that serve to provide sequenced and automatic control over opening and closing the diaphragm 16, opening and closing the compression plate 14, raising and lowering the piston 11 by controlling the motor 8, and finally controlling the ejector 13 to push a container situated on the piston sideways in one of three possible directions that are mutually spaced apart by one hundred twenty degrees around the axis AX.

In the initial state of the garbage can, the diaphragm 16 and the compression plate 14 are open, and the piston 11 is in a low position along the axis AX, which corresponds to the situation shown in FIG. 1.

Figure 2:
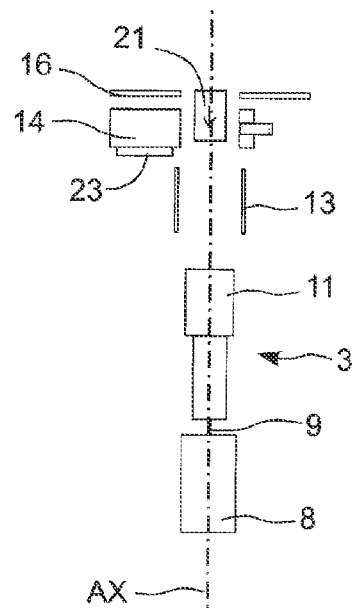
FIG. 2 is a section view showing some of the elements of the garbage can of the invention during a stage of inserting a container to be processed.

In this situation, when a user inserts a used beverage container 21 for processing into the opening 7, as shown in FIG. 2, and the container drops into the column 3 so as to become positioned on the horizontal top face of the piston in its low position.

The presence of this container on the piston 11 is then detected, e.g. by means of an optical sensor 24 provided for this purpose in the column 3, which sensor is connected to the control unit 26.

Figure 3:
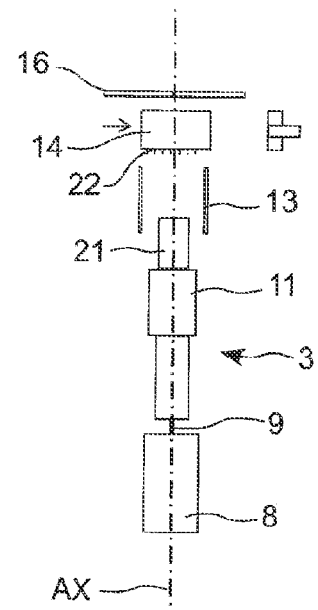
FIG. 3 is a section view showing some of the elements of the garbage can of the invention while the container for processing has been inserted.

The control unit then causes the diaphragm 16 to close the opening 7 in such a manner as to protect users, and also causes the compression plate 14 to close so as to lead to the situation shown in FIG. 3, for the purpose of compressing the container for processing.

The control unit then causes the piston 11 to rise up the axis AX in order to compress the container, which corresponds to FIGS. 4 and 5. Throughout this rise, information from a force sensor and representative of the force to which the piston 11 is being subjected is transferred to the control unit.

By way of example, the force sensor used for this purpose may be in the form of a sensor measuring the electrical power consumed by the motor throughout the rise of the piston, since this power is representative of the forces exerted by the container 21 on the 11 while it is rising.

While the container 21 is being compressed, any liquid that might remain inside the container 21 is expelled and runs over the skirt of the piston 11 into the bottom drip pan constituted by the base 6 of the casing 2.

In order to further facilitate evacuating the liquid that might be contained in the container 21, the bottom face of the compression face 14 is advantageously provided with spikes 22 or claws or sharp blades pointing downwards for puncturing the wall of the container, in particular through its stopper, while the piston 11 is rising and compressing the container against the plate 14.

These spikes, blades, or claws 22 serve in particular to compress the closed container, such as a plastics bottle that has been reclosed by its stopper before being inserted into the opening 7. Under such circumstances, the spikes 22 pierce the stopper so as to allow the air and/or any liquid to be discharged, thereby enabling the bottle to be compressed without applying excessive force.

In addition, the column 3 may be provided with lateral claws (not shown) that project towards the center in order to tear or lacerate the side wall of the container while it is rising.

Once the piston 11 has reached its maximum height, which corresponds to a certain relatively small distance from the compression plate 14, and as shown in FIG. 5, the container 21 has been compressed sufficiently so that the piston 11 is then controlled to move back down to its intermediate or middle position corresponding to FIG. 6, i.e. its ejection position.

For this purpose, the compression plate 14 may be provided with plates 23 that slide vertically along the spikes 22, and the compression plate itself may be constituted by a series of vertical plates stacked against one another. Under such circumstances, the plates 23 are controlled to move down along the spikes 22 so as to release the container in the event of it remaining attached to the spikes 22. Alternatively, the spikes 22 could equally well present shapes suitable for piercing the container without any risk of becoming jammed therein so as to avoid retaining it when the piston 11 moves back downwards.

Once the piston has reached the ejection position, its top face is situated immediately below the level of the ejector 13, which in this example is constituted by paddles capable of turning about vertical axes to push the container 21 sideways away from the central column 3, which corresponds to the situation of FIG. 7.

The ejector 13 is designed to be capable of pushing the container 21 sideways in a desired direction selected from three possible directions so as to cause the container to drop off into one of the three bags 17, 18, and 19, depending on whether the container is a metal can, a plastics bottle, or a goblet made of plastics or of card.

The bag 17, 18, 19 to which the container 21 is ejected is selected on the basis of the forces to which the piston 11 was subjected while it was rising and moving back down along the axis AX, since the way these forces vary makes it possible to determine the initial height of the container, its initial weight, its strength in compression, and also its compressed height and its empty weight.

More concretely, during the rising stage, while the container has not yet come into contact with the compression plate, the forces to which the piston 11 are subjected are representative mainly of the initial weight of the container, possibly together with the weight of the liquid it contains.

When the force subsequently rises sharply, that corresponds to the container 21 coming into contact with the bottom face of the compression plate 14, thereby making it possible to determine its initial height, e.g. by determining the time between the beginning of the piston rising and the appearance of the sharp rise in force.

The forces to which the piston 11 is subjected after this sharp rise in force [continue to rise] until the end of compression. Furthermore, the high position of the piston, i.e. the position that it reaches at the end of compression, corresponds to the position in which the piston comes to rest once the motor 8 has developed its maximum torque, and as a result it makes it possible to determine the height of the compressed container.

Finally, the forces to which the piston 11 is subjected while it is moving back down to the ejection position are representative of the empty weight of the container, since by then it has necessarily been emptied of the majority of any content it might have had.

It can readily be understood that having knowledge available at the end of the cycle about the initial height of the container together with its initial weight, its compression strength, its compressed height, and also its empty weight, usually makes it possible for the control unit to determine in automatic manner whether the container is a plastics bottle, a metal or aluminum can, or indeed a goblet made of plastics material or card.

In practice, sorting can be performed on the basis of verifying the initial height of the container and its compressed height, and also verifying the compression strength it develops while being compressed.

In addition, the system may be provided, e.g. on the top face of its piston, with an electric circuit 25 for measuring the electrical conductivity of the container so as to make it possible in simple and direct manner to identify the situation in which the container is a metal or aluminum can.

Furthermore, when evaluating the initial weight of the container, the container may be rejected since the weight in question is too great, which might correspond for example to a container that cannot be processed, such as a glass bottle, or indeed a container that contains too great a quantity of liquid to allow it to be processed.

Under such circumstances, the control unit 26 may for example control the garbage can so that it opens the diaphragm 16 and the compression plate 14, and causes the piston 11 to rise so as to present the non-processed container to the user so that the user can take it back.

As shown in FIGS. 8 to 11, in this example, the elector 13 has three paddles referenced 13a, 13b, and 13c, which paddles are carried by the structure 12 and are arranged in such a manner that together they surround the base situated at the top of the piston 11 when it is in its intermediate election position.

More particularly, the paddle 13a is mounted to pivot with its end furthest from the center being hinged about an axis AXa carried by the structure 12 and parallel to the axis AX while being off-center relative thereto. The opposite end of this paddle 13a, i.e. the end that is closest to the axis AX, presents the shape of one-third of a cylinder so as to surround about one-third of the space situated above the piston 11 when the paddle is at rest as shown in FIG. 8.

The paddles 13b and 13c are identical to the paddle 13a, and they are mounted in the same manner on the carrier structure 12 so as to pivot about off-center axes AXb and AXc, with these three paddles being uniformly distributed around the axis AX: they are spaced apart from one another about this axis by one hundred twenty degrees.

Thus, when these three paddles are at rest, as shown in FIG. 8, their central ends, each occupying one-third of a cylinder, together surround the space situated at the top of the piston 11 while it is at rest, which corresponds to the situation shown in FIGS. 8 and 10.

When the paddle 13a turns through about one-third of a revolution about its axis AXa, its central end is to be found substantially over the opening of the bag 17, such that this paddle serves to push a container resting on the piston 11 sideways towards the opening of the bag 17 in order to cause the container to drop into this bag.

Each paddle is suitable for turning about the axis on which it is mounted, turning clockwise or counterclockwise, these paddles being moved by a motor-driven system with springs (not shown).

As shown in FIGS. 9 and 11, ejecting a container resting on the piston 11 towards the bag 17 thus consists initially in causing the paddles 13b and 13c to pivot through about one-sixth of a revolution in a clockwise direction so as to release two-thirds of the outline of the container, after which the paddle 13a is caused to turn through about one-sixth of a revolution in the counterclockwise direction so as to cause the container to drop into the bag 17.

Given the symmetry of the arrangement of the three paddles 13a, 13b, and 13c, and of the ways in which they move, it can readily be understood that an analogous sequence enables a container to be pushed into the bag 18 by causing the paddles 13a and 13c to turn clockwise and then causing the paddles 13b to turn counterclockwise. A container is ejected to the bag 19 by causing the paddles 13a and 13b to turn clockwise and then causing the paddle 13c to turn counterclockwise.

In operation, and as mentioned above, the control unit determines the type of container that is being processed on the basis of the profile of the forces to which the piston is subjected while it is rising and moving back downwards, and thereafter it controls the ejector 13 so as to run the appropriate sequence of movements for the paddles to eject the container into the bag that corresponds to its type.

In general manner, the garbage can may be dimensioned to have a height of about one meter and a diameter of about fifty centimeters, and its components may be selected to obtaining a cycle time of the order of a few seconds, thus enabling the garbage can to be used in business or office premises, or indeed in public places.

The invention claimed is:

1. A beverage garbage can comprising an enclosure presenting a top opening and containing:
   a compression plate movable between a disengaged position and a compression position in which it closes the opening;
   a piston situated facing the opening below the compression plate, the piston being mounted to move in translation along an axis between a low position, an ejection position, and a high position in which it is close to the compression plate when it is closed;
   an ejector for pushing a container resting on the piston while in its ejection position in a sideways direction so as to cause the container to drop sideways off the piston;
   a control unit associated with motor means for successively causing the compression plate to close after a container has been inserted into the top opening, to cause the piston to rise towards its high position so as to compress the container against the compression plate, to cause the piston to be lowered to the ejection position, and to cause the container to be ejected by making it drop sideways off the piston;
   and
   at least one receptacle offset sideways relative to the travel axis of the piston and extending between the bottom drip pan and the piston in its ejection position in order to collect the compressed container when it is ejected sideways by the ejector, wherein the ejector comprises a plurality of paddles extending substantially radially relative to the travel axis of the piston and regularly distributed around this axis, each paddle being pivotally mounted at one of its ends carried by an axis that is off-center relative to the travel axis of the piston and parallel to this axis, and having another end forming pusher that is closer to the travel is of the piston, the pusher-forming ends of the various paddies being arranged so that together they surround the space situated above the piston in the ejection position when the ejector is at rest, and wherein a container is ejected in a direction orthogonal to a given paddle by causing the other two paddles to cause their ends to move away from the travel axis of the piston, and then causing the given paddle to turn in the opposite direction.

2. The garbage can according to claim 1, including identification means for identifying the type of container being processed, a plurality of receptacles distributed around the travel axis of the piston, the ejector suitable for pushing the container resting on the piston selectively to one or another of the receptacles, and wherein the control unit controls the ejector to cause it to push the container towards a particular receptacle that has been selected on the basis of the type of container recognized by the identification means.

3. The garbage can according to claim 2, wherein the identification means for identifying the type of container comprise a sensor for sensing the forces to which the piston is subjected while it is rising and moving back down, and means for analyzing variation in these forces in order to determine the initial height of the container and/or its initial weight and/or its compression strength and/or its height once compressed and/or its weight once compressed.

4. The garbage can according to claim 1, having three distinct receptacles uniformly distributed around the travel axis of the piston, and wherein the ejector has three paddles regularly distributed around the travel axis of the piston.

5. The garbage can according to claim 1, wherein the compression plate has spikes or sharp blades on its bottom face to pierce the container while it is being compressed against the plate by the piston rising towards its high position.

* * * * *